March 5, 1963  C. A. SHERMAN  3,080,042
LUMBER FEEDER FOR RANDOM LENGTHS AND WIDTHS
Filed Oct. 27, 1961  3 Sheets-Sheet 1

INVENTOR.
CHARLES A SHERMAN
BY
ATTORNEYS

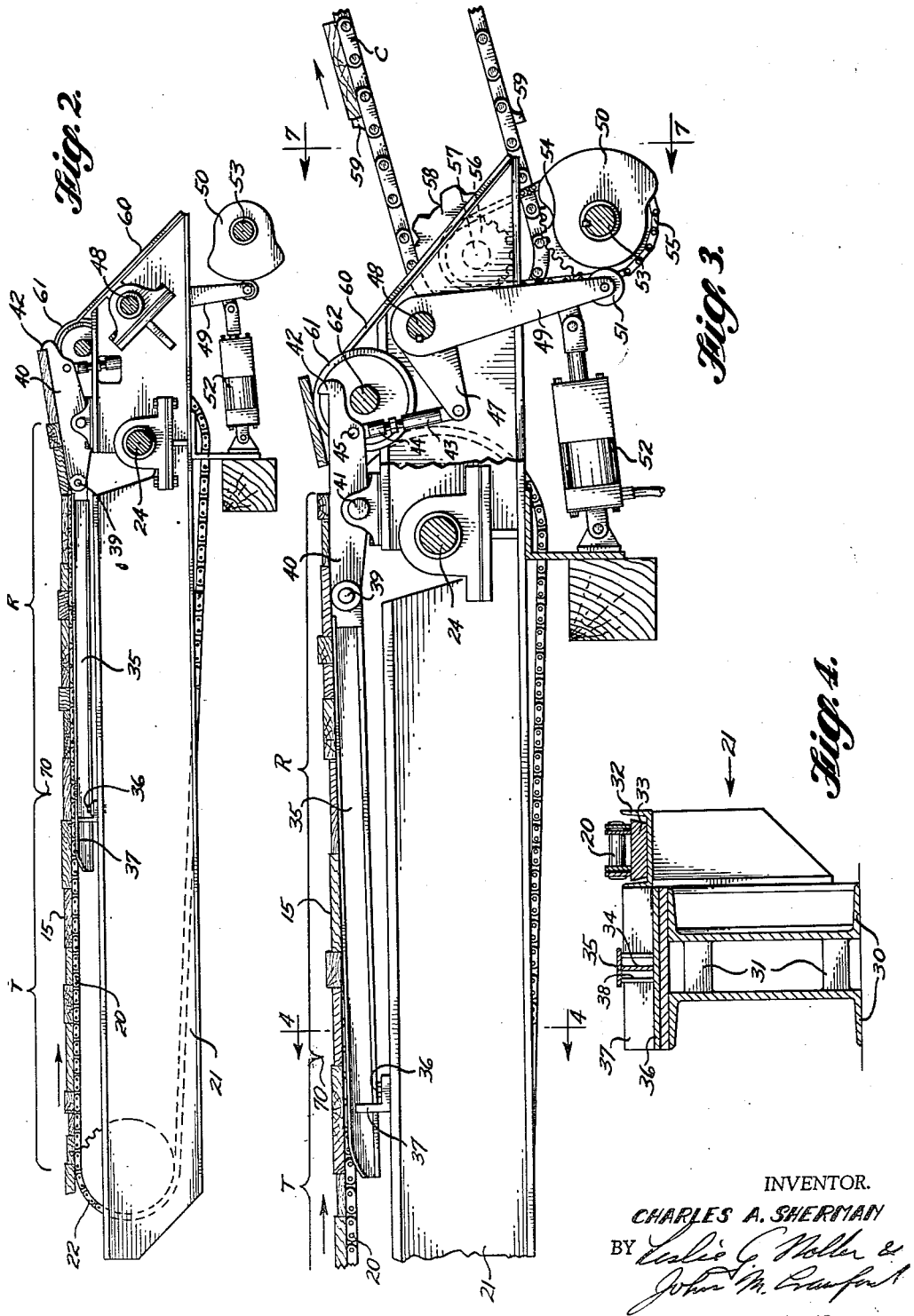

March 5, 1963   C. A. SHERMAN   3,080,042
LUMBER FEEDER FOR RANDOM LENGTHS AND WIDTHS
Filed Oct. 27, 1961   3 Sheets-Sheet 3
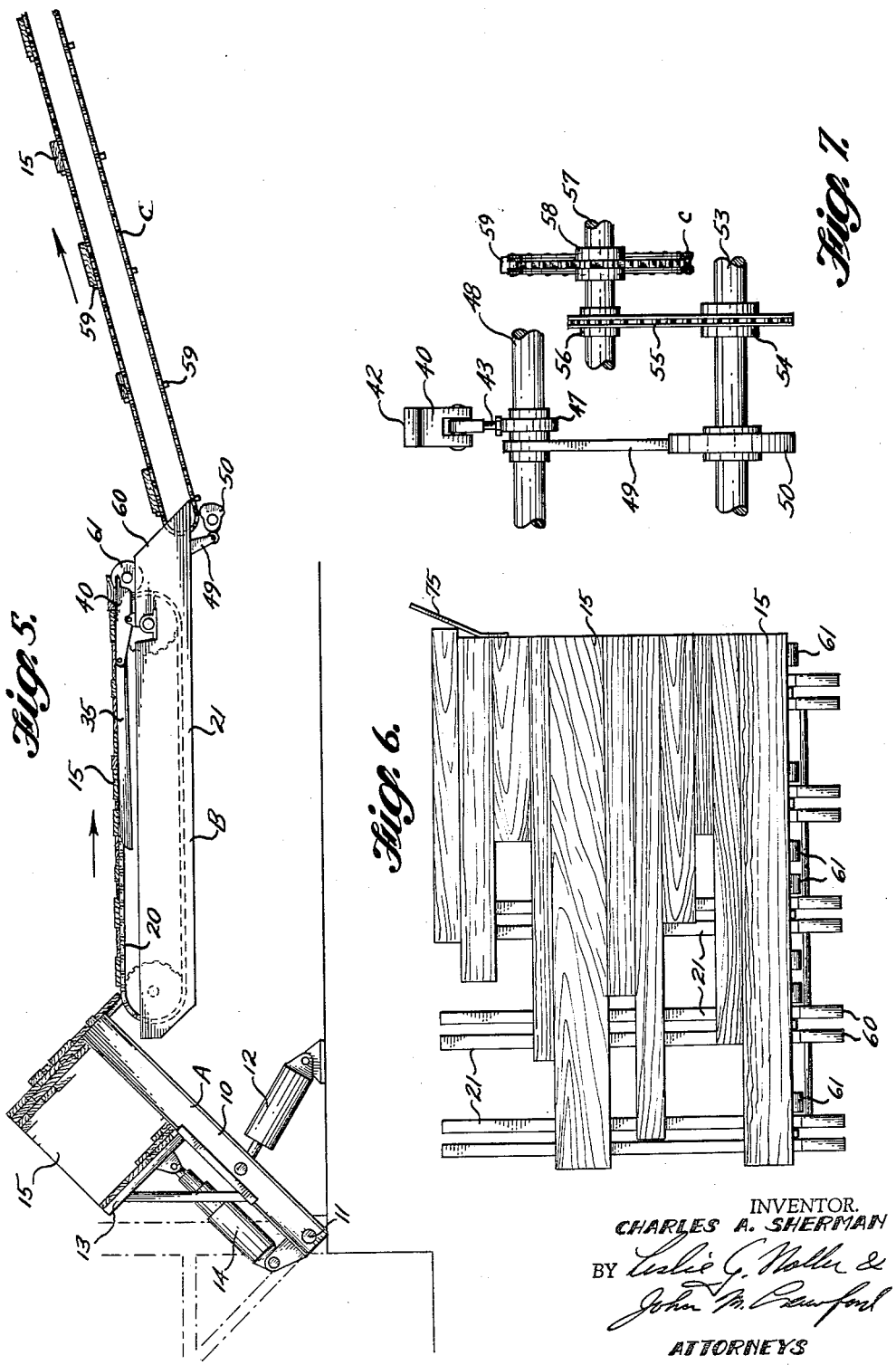
INVENTOR.
CHARLES A. SHERMAN
BY
ATTORNEYS United States Patent Office 3,080,042
Patented Mar. 5, 1963

3,080,042
LUMBER FEEDER FOR RANDOM LENGTHS AND WIDTHS
Charles A. Sherman, Tacoma, Wash., assignor to Weyerhaeuser Company, Tacoma, Wash., a corporation of Washington
Filed Oct. 27, 1961, Ser. No. 148,059
16 Claims. (Cl. 198—34)

This invention relates to a transfer mechanism for feeding boards one at a time from a supply of boards on a table.

Conventional sawmill equipment usually includes a lug chain conveyor for conveying boards spaced apart at intervals to trimming saws and other equipment that can treat only one board at a time. Automatic feeders heretofore used for removing the boards from a supply and placing them one at a time at predetermined intervals on the lug chain conveyor have been subject to objectionable limitations. In order to handle boards of varying length, width and thickness, certain adjustments have been provided but in order to take advantage of such adjustments it has been necessary to sort the boards beforehand, particularly with respect to width, so that wide and narrow boards would not be intermingled. When the transfer mechanism was adjusted for wide boards, it would not feed narrow boards one at a time and when it was adjusted for narrow boards, it would not satisfactorily feed wide boards.

This particular limitation has required a great deal of extra handling of the lumber and has also required the provision of space to set aside quantities of lumber of different widths so that the necessary adjustments of the feeding mechanism would not have to be made too often. The lumber feeders heretofore known and used could not handle a supply of boards in which wide and narrow boards were intermixed, because it would be impossible to change the adjustment of the transfer mechanism from board to board and, even if this could be done, it would not be economically practicable to assign a special operator to this particular function exclusively.

Similar difficulties were encountered in the handling of random length and random thickness lumber.

The general object of the present invention is, therefore, to provide a lumber feeder which will remove one board at a time from a supply of intermixed wide and narrow boards.

Another object is to provide a feeder of the type described which will handle boards of random thickness and length.

Another object is to provide a random width lumber feeder which will operate automatically on intermixed boards of different widths to remove one board at a time at regular predetermined intervals without requiring adjustments of the mechanism.

A more particular object is to provide a lumber transfer mechanism which will accumulate a supply of boards on a table and pick off the boards one by one regardless of width and deposit them at regular intervals ahead of the lugs on a lug chain conveyor in a sawmill or a planing mill.

Whereas prior lumber feeders have utilized pairs of alternately retractable front and back stops which require adjustment to space them apart a distance slightly less than the width of the boards which are continuously crowded against the stops in edgewise movement, the present mechanism operates on a new and different principle to obviate the necessity for any such adjustment. In the present mechanism only one set of stops is used, and the boards are not crowded continuously against the stops. The leading edge portion of the leading board rests against the set of stops and is supported above a series of power driven rollers, and when the stops are retracted and the board is lowered onto such rollers, it is immediately withdrawn thereby while at the same time the crowding action of the following boards is temporarily interrupted so that only the leading board is propelled forward by the rollers. The temporary interruption of the crowding action of the following boards allows these boards to remain out of contact with the rollers at such time. Then, when the leading board has passed on, the stops are repositioned and the crowding action is resumed to move all the boards forward in readiness for the next cycle. In this way only one board is fed in each cycle regardless of its width and the boards do not have to be segregated or the machine adjusted to maintain the desired single board in delivery.

The crowding action is usually maintained only through the section corresponding to the common length of the boards normally handled by the machine so that the boards will be maintained perpendicular to the direction of travel.

The invention will be better understood and additional objects and advantages will become apparent from the following description of a preferred embodiment illustrated on the accompanying drawings. Various changes may be made, however, in the construction and arrangement of parts and certain features may be used without others without departing from the spirit of the invention as defined in the appended claims.

In the drawings:

FIGURE 2 is a side elevation view showing certain details of one of the multiplicity of feed mechanisms in FIGURE 1 which engage and support the boards at intervals across the width of the transfer table;

FIGURE 3 is an enlarged view similar to FIGURE 2 showing additional details of the mechanism and in a different phase of its cycle of operation;

FIGURE 4 is a cross sectional view taken on the line 4—4 of FIGURE 3;

FIGURE 5 is a view similar to FIGURE 2 but on a smaller scale to include means for supplying boards to the transfer table and further including a lug conveyor for removing the boards;

FIGURE 6 is a top plan view of the transfer table showing a typical array of boards thereon of random width, length and thickness; and FIGURE 7 is a fragmentary view on the line 7—7 of FIGURE 3 showing the cam drive arrangement for the transfer arms.

Figure 1:
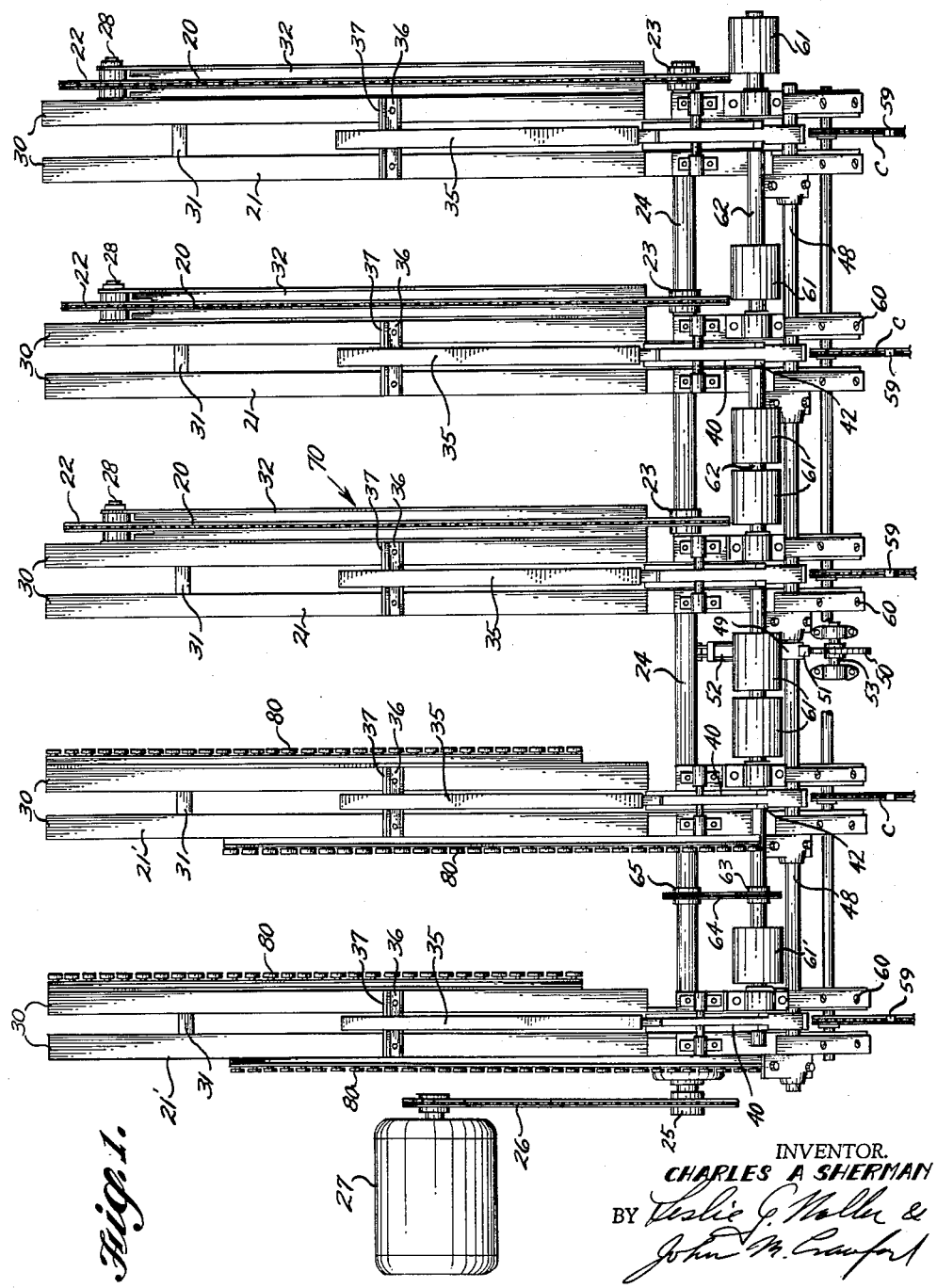
FIGURE 1 is a top plan view of a transfer table embodying the principles of the present invention.

FIGURE 5 shows a typical mill installation for the purpose of illustrating the function of the present lumber feeder. A hoist A supplies lumber of random width, length and thickness to the transfer table B which incorporates the features of the invention. On the transfer table B the boards are crowded together in the direction of the arrow in edge-abutting relationship in a single layer. A novel feed mechanism in transfer table B delivers one board at a time in edgewise movement to the lug chain conveyor C, depositing a board ahead of each set of lugs on the conveyor chains so that the boards will be spaced apart as shown for arrival at the proper intervals at the trimming saws (not shown) and other equipment which must treat the boards one at a time.

Hoist A comprises a plurality of uprights 10 mounted on pivots 11 at their lower ends. The uprights 10 may be rocked from the vertical loading position shown in broken lines to the tilted unloading position shown in full lines by an hydraulic cylinder 12 or other suitable mechanism. A platform 13 is mounted for vertical sliding movement on the uprights 10 whereby it may be raised and lowered by a second hydraulic cylinder 14.

When the uprights 10 are in vertical position and the platform 13 is lowered, the platform is horizontal and will receive a load of lumber 15 which may be deposited on the platform by a lift truck or lumber carrier. The boards in the load 15 extend perpendicular to the plane of the view and the successive layers are usually separated by slats or strips extending transversely of the boards.

When the uprights 10 are tilted toward the transfer table, the boards slide off in edgewise movement onto moving chains 20 on the transfer table one layer after another and the separating slats drop to the floor between the chains and between the uprights 10. As the successive layers of boards are removed, platform 13 is raised step by step by cylinder 14 to maintain a substantially constant feeding operation as shown. Hoist A forms no part of the present invention and is described merely for the purpose of illustrating suitable means for depositing boards on the transfer table B. Alternatively, boards may be supplied to the transfer table B by a hopper mechanism, by conveyor chains or by hand, as long as the boards are placed approximately perpendicular to the chains 20 and an adequate supply of boards is maintained on these chains in a single layer.

Turning now to FIGURE 1, it will be observed that there are a plurality of the longitudinal chains 20 associated with a plurality of longitudinal beam assemblies 21 which together constitute the transfer table B in FIGURE 5. Each chain 20 is trained around an idler sprocket wheel 22 on a stub shaft 28 mounted on the leading end of the beam assembly and a driving sprocket wheel 23 on a long shaft 24 extending through the trailing ends of all the beam assemblies. Each sprocket wheel 23 is keyed to the shaft 24 and the latter is driven by a sprocket wheel 25 and chain 26 from a motor 27. The speed of motor 27 may be controlled in any well known manner to adjust the feed rate and crowding action of boards on the chains 20.

As shown in FIGURE 4, the beam assembly 21 for each feed mechanism 70 comprises a pair of channels 30 secured together in spaced-apart, back to back relation by bolts passing through tubular spacers 31. Mounted on one side of each beam assembly 21 is a channel guide track 32 supporting the upper reach of the chain 20. The bottom of channel 32 is reinforced with a riding strip 33 on which the chain slides freely under the weight of a layer of boards.

The beam assembly 21 carries a lift skid 35 which extends from a point at some distance from sprocket wheel 22 approximately to the sprocket wheel 23. Lift skid 35 is T-shaped in cross section with its lower edge adjacent the leading end resting loosely on a bearing plate 36 associated with a vertically slotted upstanding guide 37. The vertical web 34 of lift skid 35 is disposed in the slot 38 of guide 37 so that the lift skid cannot move laterally while at the same time it has freedom for rocking and longitudinal movements on bearing plate 36. The top surface of lift skid 35 is slightly below the level of the top surface of chain 20 at the guide 37.

The trailing end of each lift skid 35 is pivotally connected at 39 to one end of a rocking transfer arm 40 as shown in FIGURE 3. Transfer arm 40 is supported at its mid-point on a pivot 41 and the other end of the arm is equipped with an upstanding projection or hook 42 which forms a board stop. This end of the arm is raised and lowered by a link 43 having a length adjustment 44. The upper end of link 43 is pivotally connected with the arm 40 at 45 and the lower end of the link is pivotally connected with a lever 47 which is keyed to a rock shaft 48 extending through all the beam assemblies 21.

Rock shaft 48 is oscillated by a cam follower arm 49 which is actuated by cam 50. A roller 51 on the end of arm 49 is held resiliently against the cam 50 by an air cylinder 52 connected with a supply of compressed air. Cam 50 is keyed to a cam shaft 53 carrying a sprocket wheel 54 which is driven by a chain 55. Chain 55 is driven by a sprocket 56 on the shaft 57 of lug chain conveyor C. The chains of conveyor C pass around end sprockets 58 keyed to shaft 57, and sprocket 56 is likewise keyed thereto. The cam action and drive means just described is further illustrated in FIGURE 7 but these details have been omitted in FIGURE 1 for clarity of the other features. The chains of lug conveyor C are equipped at intervals with upstanding lugs 59 which engage the trailing edges of boards 15 on the chains to move them forward.

The trailing ends of beam assemblies 21 are equipped with inclined slide plates 60 which carry the boards to the lug conveyor C. The boards are deposited on slides 60 by a plurality of rollers 61 mounted on a through shaft 62. These rollers are preferably rubber covered but such covering is not required in all cases. In its upper position stop 42 holds the leading edge of the first board just above the top center of roller 61 as shown in FIGURE 2. Stop 42 retracts to a depressed position shown in FIG. 3 just below the top surface of the roller whereby the first board is pulled forward by the roller and deposited on slides 60 from whence it is picked up by lug conveyor C. The timing of cam 50 is arranged to cause stop 42 to be retracted so that a board will be deposited on the chain conveyor C just ahead of each lug 59. Roller shaft 62 is driven by a sprocket wheel 63 carrying a chain 64 driven by a sprocket wheel 65 on the shaft 24 as shown in FIGURE 1.

In FIGURE 3 it will be observed that the top of roller 61 is above the level of chain 20 and the top or board supporting surface of transfer arm 40 is approximately level and at an intermediate height above chain 20 but below the top of roller 61. When transfer arm 40 is rocked to its FIGURE 2 position, its trailing end adjacent stop 42 is elevated above roller 61 while its trailing end adjacent pivot 39 is depressed below the level of chain 20.

The length of arm 40 preferably equals or exceeds the width of the widest boards to be handled but this relationship is not critical. Roller 61 is of such diameter and in such position with respect to arm 40 that it does not overlap the arm 40 behind stop 42 a distance greater than the width of the narrowest boards to be handled whereby the roller can never engage the second board and feed two boards at a time.

*Feed Mechanism Operation*

When cam follower roller 51 rides on the high part of cam 50, as shown in FIGURE 2, the whole length of lift skid 35 is disposed below the level of chain 20 and out of contact with the under sides of the boards. At such time the chains 20 crowd the leading boards up the inclined top surface of transfer arm 40 and press the leading edge of the leading board against the stop 42 above the top surface of roller 61. The chains 20 are smooth on top and continue to slide under the boards which are thus held stationary, the chains exerting a frictional crowding action which tends to straighten out any misaligned boards and hold them snugly together in edge abutting relation.

When cam follower roller 51 drops down onto the low portion of cam 50 as shown in FIGURE 3, stop 42 is depressed below the top of roller 61 whereby the leading board is engaged by the roller, carried over the roller and over stop 42, the top surface of transfer arm 40 now being approximately horizontal and slightly above the chain 20. This new position of arm 40 elevates the pivotal connection 39 so that substantially the whole length of transfer skid 35 is also raised slightly above the level of chain 20. In such position the arm 40 and lift skid 35 disengage the boards thereon from the chain 20 and at the same time impose a frictional resistance to movement of these boards which is superior to the tractive force exerted by chains on the relatively few boards between lift skid 35 and sprocket wheel 22. Hence, the boards behind the leading board do not move forward when the stop 42 is depressed.

The removal of the leading board by the power driven rollers 61 as shown in FIGURE 3 thus leaves a gap between stop 42 and the second board. This gap is not closed until cam follower roller 51 again moves onto the high portion of cam 50 depressing lift skids 35 and lowering the boards on the lift skids again into contact with the moving chains 20. Then the boards are all crowded forward again against the stop 42 as shown in FIGURE 2. Cam 50 is timed in accordance with the positions of lugs 59 on conveyor C, making one revolution with the passing of each lug, so that the boards are transferred one at a time to the conveyor C at the proper intervals to deposit a single board ahead of each lug.

The action described with reference to FIGURES 2 and 3 takes place at each feed mechanism 70, there being a lift lever 47, transfer arm 40 and lift skid 35 adjacent each chain 20, as indicated in FIGURE 1. In the same manner, the lug chain conveyor C comprises a plurality of laterally spaced parallel chains according to conventional practice.

The rise and fall of stop 42 may be controlled with respect to the level of the top of roller 61 by adjustment 44 in link 42 so that even very narrow boards will feed one at a time in the manner described. It is apparent that since only the leading edge portion of each board is engaged by roller 61, the feeding action above described is independent of the width of the boards. Thus, wide and narrow boards can be intermingled indiscriminately and the present feeder is aptly described as a random width feeder.

In making up the loads of lumber 15 in FIGURE 5, the ends of the boards are preferably evened up at one end of the load and the transfer table B is preferably further equipped with a common form of end aligner 75 to even up the ends of the boards as shown in FIGURE 6. This is ordinarily done in conventional feeders before placing the boards on a lug conveyor to the trimmer saws. When the boards are thus evened at one side of the transfer table, it is found to be of assistance in keeping them perpendicular to the chains to use feed mechanisms 70 and driven rollers 61 only in the section of common length. In the illustrated embodiment (FIG. 1) there are three feed mechanisms 70 on the right side of the machine and the rollers 61 mounted in conjunction with these feed mechanisms are driven. The two beam assemblies 21' on the left side of the machine have skate rolls 80 mounted thereon, and the rollers 61' mounted in conjunction with these assemblies are left loose on shaft 62. This has proved to be effective in maintaining the long boards as well as the short boards perpendicular to the direction of travel as the boards are deposited on slides 60 and lug conveyor C.

While the two beam assemblies 21' have been illustrated with a lift skid 35 and a rocking transfer arm 40, it should be realized that their use with these beams is optional. If there is no tendency for the freewheeling rollers 61' to drive the material forward then there is no need for the lift skids and transfer arm.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A random width lumber feeder comprising means for crowding boards together and conveying them in edgewise movement, a stop engageable with a leading board to stop the advance of the crowded boards, feed means adjacent said stop, means to retract said stop and engage the leading edge portion of the leading board with said feed means, friction means engageable with each of a plurality of boards behind said leading board, and means actuated by the retraction of said stop to engage said friction means with said boards and restrain the advance thereof while said stop is retracted.

2. A single stop random width lumber feeder comprising means for conveying boards in edgewise movement, a stop engageable with a leading board to stop said movement and cause the boards to be crowded together in edge abutting relation, feed means adjacent said stop, means to retract said stop and engage only the leading edge portion of the leading board with said feed means, and means actuated by the retraction of said stop to disengage a plurality of boards behind said leading board from said conveying means and restrain the movement thereof while said stop is retracted.

3. A single stop random width lumber feeder for feeding intermixed boards one at a time having different widths within a predetermined range, comprising an edgewise crowding conveyor, a stop for arresting the crowding movement of the boards on said conveyor, feed means overlapping the leading side of said stop a distance not exceeding the width of the narrowest board in said predetermined range, means to retract said stop downward below said feed means, and lift skids in said conveyor actuated upward by the downward movement of said stop for lifting a plurality of boards on said crowding conveyor out of engagement therewith to restrain the movement of said boards while said stop is retracted.

4. In a lumber feeder, a conveyor for carrying boards in edgewise movement, a stop engageable with a leading board to stop said movement and cause the boards to be crowded together against said stop, a feed roller adjacent said stop, means to retract said stop below said feed roller and engage the leading edge portion of said leading board with said feed roller, and means to disengage a plurality of boards behind said leading board from said conveyor while said stop is retracted.

5. In a lumber feeder, a plurality of smooth conveyor chains arranged to carry boards in edgewise horizontal movement, a stop engageable with a leading board to stop said movement and cause the boards to be crowded together against said stop, a feed roller adjacent said stop, means to retract said stop and engage the leading edge portion of said leading board with said feed roller, and means actuated by said stop to frictionally engage the horizontal surfaces of a plurality of boards behind said leading board to restrain the movement thereof while said stop is retracted.

6. In a lumber feeder, a plurality of smooth conveyor chains arranged to carry boards in edgewise movement, a stop engageable with a leading board to stop said movement, a feed roller adjacent said stop, means to retract said stop and engage the leading edge portion only of said leading board with said feed roller, and means actuated by said stop to lift a plurality of boards behind said leading board off said conveyor chains while said stop is retracted.

7. A lumber feeder comprising a lug chain conveyor arranged to carry boards in spaced apart edgewise movement, a crowding conveyor having a stop to hold back a supply of boards thereon in crowded edge abutting relation, means synchronized with said lug chain conveyor for retracting said stop at intervals when said lug chain conveyor is in position to receive a board from said supply, means for lifting a plurality of said crowded boards off said crowding conveyor, and means actuated by said stop for operating said lifting means when said stop is retracted.

8. In a lumber feeder, a transfer table having means for conveying boards across said table in edgewise movement, a stop engageable with the leading board to arrest said movement and cause the boards to be crowded together against the stop, friction means engageable with the surfaces of a plurality of the crowded boards to hold the boards stationary against the tractive effort exerted by said conveying means, means to retract said stop and engage said friction means in one phase of a feed cycle and to project said stop and disengage said friction means in another phase of a feed cycle, and means to feed said leading board while said friction means is engaged.

9. In a lumber feeder, a transfer table having means for conveying boards across said table in edgewise movement, a stop engageable with the leading board to arrest said movement and cause the boards to be crowded together against the stop, lift skids mounted for vertical movement on said table to lift a plurality of boards off said conveying means, means to retract said stop at intervals to feed a board, and a connection between said stop and said lift skids for raising said lift skids when said stop is retracted and for lowering said lift skids when said stop is projected to operative position.

10. In a lumber feeder, means for conveying boards in edgewise movement, a stop for arresting said movement and causing the boards to be crowded together against said stop, skid means having vertical movement to lift a plurality of the crowded boards off said conveying means and hold said boards stationary independently of said stop, feed means adjacent said stop, and means for retracting said stop and engaging the leading edge portion only of the leading board with said feed means while said skid means is lifted.

11. In a lumber feeder, means for conveying boards in edgewise movement, a rocker arm having a stop to arrest said movement and cause said boards to be crowded together against said stop, a lift skid connected with said rocker arm, said lift skid and rocker arm forming a continuous support for a plurality of boards crowded against said stop, feed means adjacent said stop at the trailing end portion only of said rocker arm, and means for raising and lowering said stop, said stop and rocker arm having an arresting position in which said trailing end is disposed above said feed means and said lift skid is disposed below said conveying means and having a feed position in which said lift skid is raised above said conveying means and said stop and trailing end of said rocker arm are depressed below said feed means to engage the leading edge portion of the leading board with said feed means.

12. In a lumber feeder, a transfer table having a crowding conveyor, longitudinal lift skids extending along said conveyor, longitudinal rocker arms having leading ends pivotally connected with the trailing ends of said lift skids, board stops on the trailing ends of said rocker arms, feed means longitudinally overlapping only said trailing ends of said rocker arms adjacent said stops, and means for raising and lowering said stops and trailing ends of said rocker arms, said trailing ends of said rocker arms having an upper position above said feed means with said lift skids depressed below said crowding conveyor and said trailing ends of said rocker arms having a lower position below said feed means with said lift skids raised above said crowding conveyor, whereby said rocker arms engage only the leading edge portion of a single board with said feed means.

13. In a lumber feeder, a transfer table having a crowding conveyor, longitudinal lift skids extending along said conveyor, longitudinal rocker arms having leading ends pivotally connected with the trailing ends of said lift skids, board stops on the trailing ends of said rocker arms, feed rollers above the level of said crowding conveyor adjacent said stops at said trailing ends of said rocker arms, and means for raising and lowering said stops and trailing ends of said rocker arms, said trailing ends of said rocker arms having an upper position above said feed rollers with said lift skids depressed below said crowding conveyor, and said trailing ends of said rocker arms having a lower position below said feed rollers with said lift skids raised above said crowding conveyor, whereby said rocker arms engage only the leading edge portion of a single board with said feed rollers.

14. In a lumber feeder, a transfer table having a crowding conveyor, feed means at the trailing end of said table above the level of said crowding conveyor, longitudinal lift skids in said conveyor, longitudinal transfer arms extending in continuation of the trailing ends of said lift skids, the trailing ends of said transfer arms having terminal portions only longitudinally overlapping said feed means, board stops on said terminal portions of said transfer arms, and means for raising and lowering said arms and skids arranged to lift said terminal portions above said feed means and depress said lift skids below said conveyor in one direction of movement and to depress said terminal portions and stops below said feed means and raise the trailing ends of said lift skids above said conveyor in an opposite direction of movement.

15. In a lumber feeder, a transfer table having a crowding conveyor, a transverse shaft at the trailing end of said table carrying feed rollers above the level of said crowding conveyor, longitudinal lift skids in said conveyor, means pivotally supporting the leading ends of said lift skids below the level of said crowding conveyor, longitudinal rocker arms pivotally connected at their leading ends to the trailing ends of said lift skids, board stops on the trailing ends of said rocker arms approximately in the vertical plane of said feed roller shaft, and means for rocking said rocker arms between crowding and release positions, said rocker arms in crowding position having their trailing ends elevated above said feed rollers and their leading ends in a lowered position to depress said lift skids below said crowding conveyor, and said rocker arms in release position having their trailing ends and board stops depressed below said feed rollers and their leading ends in a raised position to elevate said lift skids above said crowding conveyor.

16. A lumber feeder comprising a lug chain conveyor for carrying boards in spaced apart relation in edgewise movement, a transfer table having a smooth chain crowding conveyor, a transverse shaft at the trailing end of said table carrying feed rollers above the level of said crowding conveyor and above the level of said lug chain conveyor, longitudinal lift skids in said conveyor, means pivotally supporting the leading ends of said lift skids below the level of said crowding conveyor, longitudinal rocker arms pivotally connected at their leading ends to the trailing ends of said lift skids, board stops on the trailing ends of said rocker arms approximately in the vertical plane of said feed roller shaft, a cam for rocking said rocker arms between crowding and release positions, said rocker arms in crowding position having their trailing ends elevated above said feed rollers and their leading ends in a lowered position to depress said lift skids below said crowding conveyor, and said rocker arms in release position having their trailing ends and board stops depressed below said feed rollers and their leading ends in a raised position to elevate said lift skids above said crowding conveyor, inclined slide plates on the trailing side of said feed rollers arranged to deposit boards on said lug chain conveyor, means for driving said feed rollers from said crowding conveyor, and means for driving said cam from said lug chain conveyor.

References Cited in the file of this patent
UNITED STATES PATENTS

| | | |
|---|---|---|
| 2,731,130 | Blickenderfer | Jan. 17, 1956 |
| 2,980,234 | De Koning | Apr. 18, 1961 |
| 3,019,882 | Pearson | Feb. 6, 1962 |